United States Patent
Ao et al.

(10) Patent No.: US 7,928,813 B1
(45) Date of Patent: Apr. 19, 2011

(54) TRANSIENT NOISE CONTROL FOR DIGITAL RF MODULATION

(75) Inventors: Jiening Ao, Suwanee, GA (US); Koen Van Renterghem, Ghent (BE); Jan Codenie, Lokeren (BE)

(73) Assignee: Cisco Technology, Inc., San Jose, CA (US)

( * ) Notice: Subject to any disclaimer, the term of this patent is extended or adjusted under 35 U.S.C. 154(b) by 44 days.

(21) Appl. No.: 12/551,566

(22) Filed: Sep. 1, 2009

(51) Int. Cl.
*H03C 3/00* (2006.01)
*H04L 25/00* (2006.01)
*H04L 25/02* (2006.01)
*H04L 25/03* (2006.01)
*H04L 27/12* (2006.01)
*H04L 27/20* (2006.01)

(52) U.S. Cl. .......................... 332/100; 332/103; 375/296
(58) Field of Classification Search .......... 332/100–105; 375/295–297
See application file for complete search history.

(56) References Cited

U.S. PATENT DOCUMENTS
6,320,912 B1 * 11/2001 Baba .............................. 375/264
* cited by examiner

*Primary Examiner* — David Mis
(74) *Attorney, Agent, or Firm* — Aaronson & Waldman, LLC

(57) ABSTRACT

In one embodiment, a switch provides output to a digital radio frequency (RF) modulator having a filtered input stage. The switch is configured to selectively provide a zero power data signal to the RF modulator based on a transient event control signal received at the switch.

20 Claims, 9 Drawing Sheets

TRANSIENT NOISE CONTROL FOR DIGITAL RF MODULATION

TECHNICAL FIELD

The present disclosure relates generally to digital communications.

BACKGROUND

Digital communication techniques have effectively revolutionized the communications industry by creating efficiencies in bandwidth utilization previously not possible using older analog methods. Information can now generally be conveyed more accurately at higher rates within a smaller bandwidth of a given communications medium. Where spectrum is shared through segmentation of the medium into channels, these efficiencies can permit a higher number of channels through narrower channel widths closer channel spacing than with analog techniques. Digital communication systems generally have superior noise rejection characteristics compared to their analog counterparts, yet care is still taken in their design to avoid cross channel noise that exceeds permissible thresholds. Whether bandwidth is shared across a number of entities, as in the case of government assigned airspace, or commonly owned, as in the case of a coaxial cable of a television service provider, reduction or prevention of cross channel noise can avoid potential regulatory issues, reliability problems, and customer complaints.

Digital communication methods generally include the use of an analog carrier signal that is modulated using digital data. The analog carrier permits the digital data to be transmitted in a given frequency range (i.e., a channel) without interfering with signals being transmitted on other frequencies. During normal operation, the output of a given modulation circuit is generally confined to its assigned frequencies. During a transient event, however, such as power being removed or initially supplied, components of the modulation circuitry can receive and/or output unintended signals that cause the ultimate output of the modulator circuit to include frequencies well outside its intended frequency range. This results in unacceptable broadband noise that can have a detrimental effect on other channels in the communication medium.

Overview

In general, one aspect of the subject matter described in this specification can be embodied in an apparatus including a digital radio frequency (RF) modulator with a filtered input stage and a switch connected to the input stage of the RF modulator. The switch can include an input for receiving a zero power data signal and an input for receiving a transient event control signal. The switch can selectively provide the zero power data signal to the input stage of the RF modulator based on the transient event control signal.

One aspect of the subject matter described in this specification can be embodied in an apparatus including an RF modulator for modulating a digital signal and means for switching a signal provided to an input stage of the RF modulator between a digital baseband signal and a zero power data signal based on a transient event control signal.

One aspect of the subject matter described in this specification can be embodied in methods that include the actions of receiving a transient event control signal and providing a zero power data signal to a filtered input stage of a digital RF modulator based on the transient event control signal to limit the generation of noise by the RF modulator outside of an assigned channel.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DESCRIPTION OF EXAMPLE EMBODIMENTS

Figure 1:
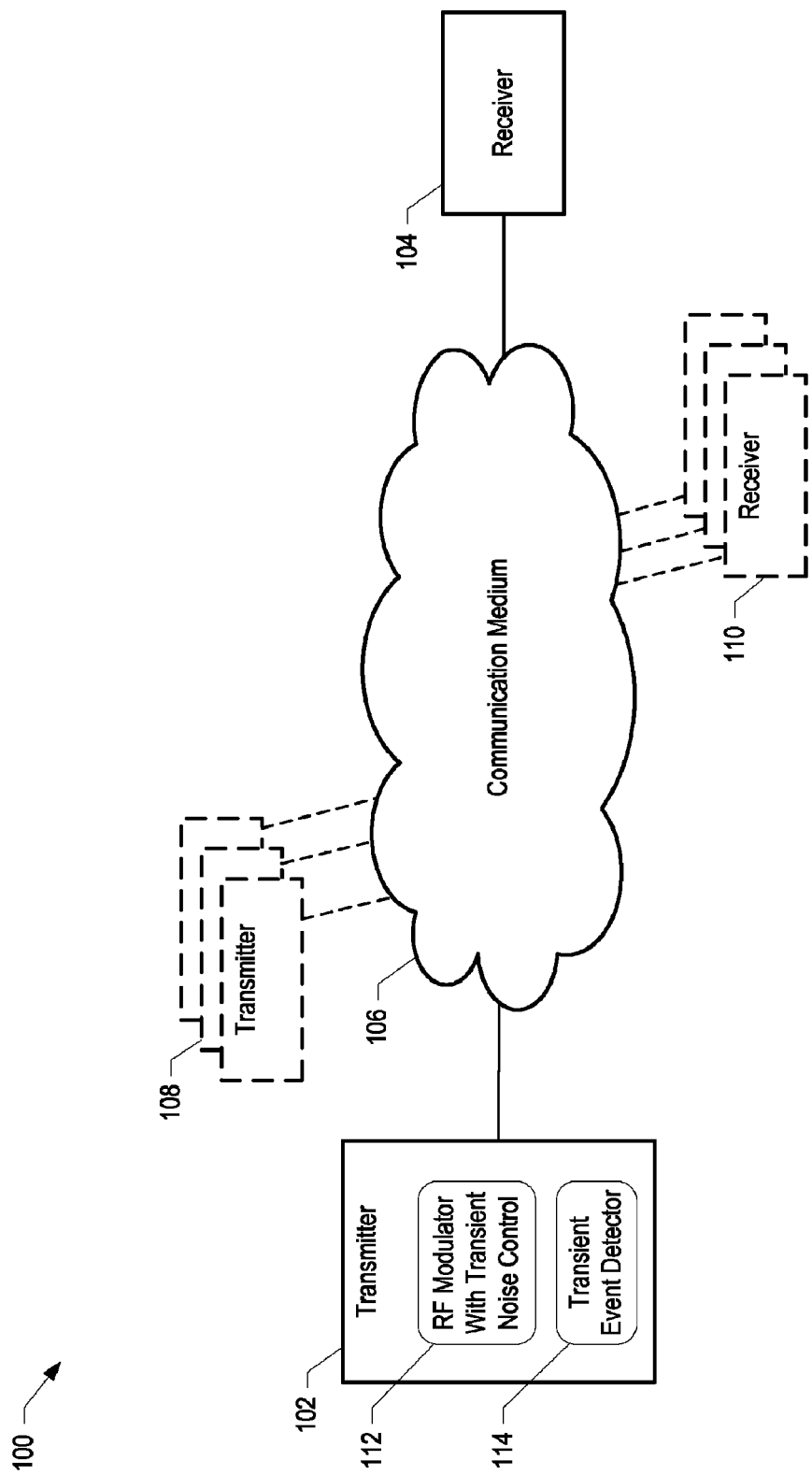
FIG. 1 illustrates an example environment for a radio frequency (RF) modulator with transient noise control.

FIG. 1 illustrates an example environment 100 for a radio frequency (RF) modulator with transient noise control 112. The transmitter 102 sends digital data to the receiver 104 over the communication medium 106. The communication medium can be any medium through which a transmitted signal can propagate including, but not limited to, the electromagnetic frequency spectrum of the public airwaves, electrically conductive cables, and optical waveguides. The available bandwidth of the communication medium 106 can be divided into two or more channels to enable the propagation of multiple, non-interfering signals using, for example, frequency division multiple access (FDMA). FDMA can permit sharing of the communications medium across a number of devices and/or communication services. The transmitter 102, and the additional transmitters 108 adhere to an FDMA scheme by transmitting within respective channels. Channel assignments can be temporary such that they expire after a certain amount of time (e.g., a day, or week, or after completion of a given communication) or more permanent in nature. The transmitter 102 is designed to operate within the frequencies of its assigned channel so as not to interfere with any of the additional transmitters 108 and/or the receipt of signals sent by the transmitters 108 to, for example, the receiver 104 and/or one or more of the additional receivers 110.

Certain occurrences, however, can potentially cause the transmitter 102 to output signals on frequencies outside of its assigned channel that have sufficient power to cause interference on other channels. These occurrences include, for example, loss of power to the circuitry of the transmitter 102 and initial power application to the circuitry of the transmitter 102 that places the transmitter into an operative state after some period of being powered down. Such occurrences are referred to herein as transient events.

A power loss transient event during operation of the transmitter 102 can be caused, for example, by loss of electrical power from the public power grid due to an outage, activation of an electrical protection device such as the tripping of an electrical breaker or burning out a fuse, an individual removing an electrical power cord from an outlet, failure of one or more transmitter components, or removal one or more transmitter components. Power can also be intentionally turned off by an operator, or removed by operation of the transmitter 102 itself to, for example, prevent overheating of one or more transmitter components or upon detection of a current that exceeds design parameters.

An initial power up transient event can occur, for example, as the result of an operator powering up the transmitter 102, recovery from a power outage, or recovery from a protective shutdown due to, for example, thermal overload or current overload.

Transient events can potentially introduce broadband noise if they result in spikes, dips, or other sudden discontinuities in the output signal of the transmitter 102. To aid in preventing emission of broadband noise, the transmitter 102 includes an RF modulator with transient noise control 112, and a transient event detector 114. The transient event detector can detect an impending or actual transient event and provide a signal to the RF modulator indicating that a transient event is imminent or underway. In response to this transient event signal, the RF modulator with transient noise control 112 can modify its operation to prevent the generation of an output signal with abrupt discontinuities that appear in the frequency domain as broadband interference.

As an example, the transient event detector 114 can detect the loss of power at an input to a power supply that powers the circuitry of the RF modulator 112. As a result the transient event detector 112 sends a transient event control signal indicating the loss of power to the RF modulator 112. Generally, there is a short delay between loss of input power at a power supply input and the resulting drop off in the power supply's output. During this short period, the RF modulator 112 can modify its mode of operation to prevent discontinuities in its output having frequency components outside of the channel allocated to the transmitter 112.

Figure 2:
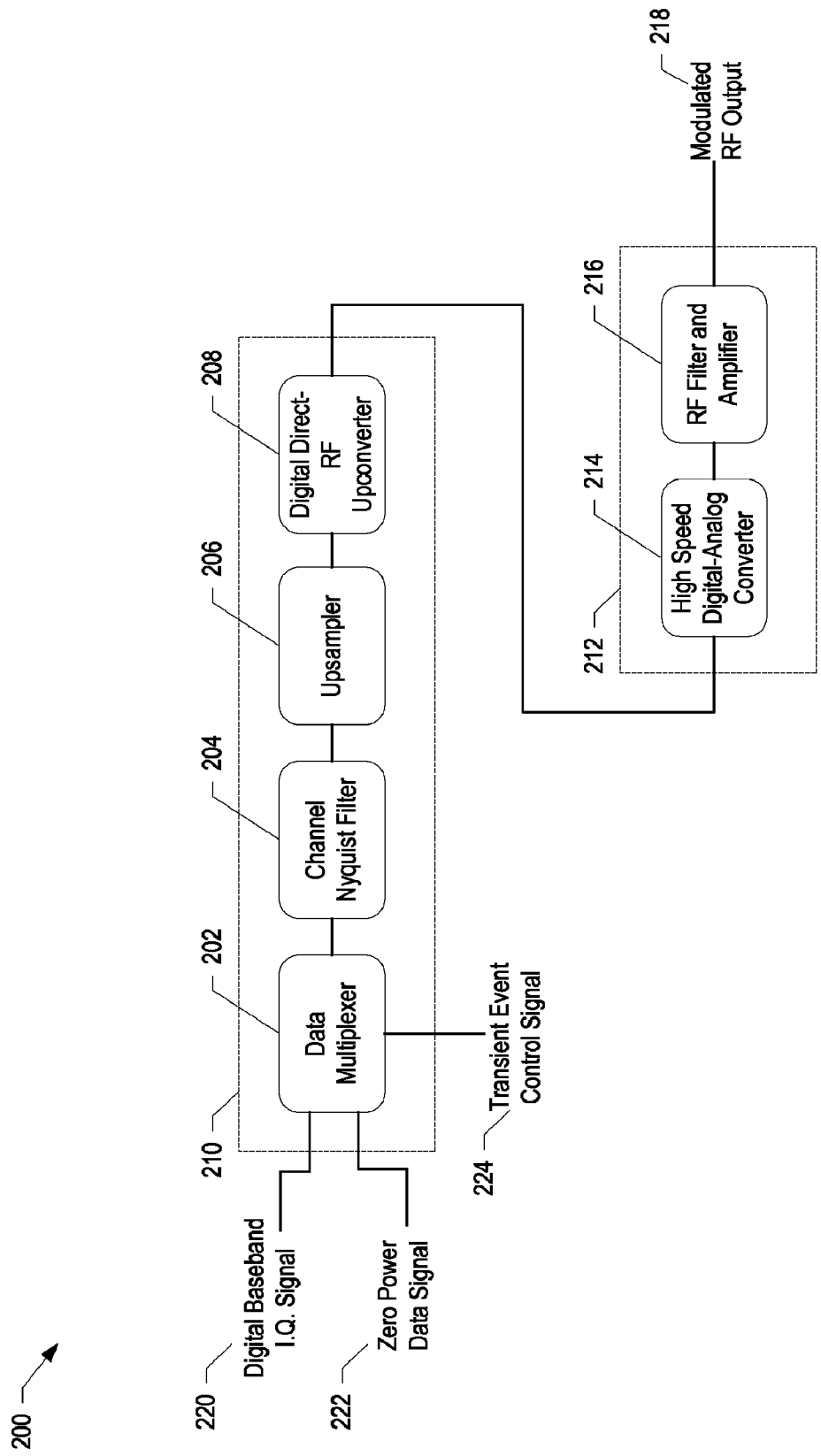
FIG. 2 illustrates an example implementation of an RF modulator including transient noise control.

FIG. 2 illustrates an example implementation 200 of an RF modulator including transient noise control. The example implementation 200 is a direct-RF quadrature amplitude modulation (QAM) RF modulator. The example QAM modulator can employ, for example, a 16-QAM modulation scheme. A QAM RF modulator is shown as an example. The transient noise control techniques described in this disclosure are not limited to any particular digital modulation scheme or hardware.

The example QAM modulator 200 includes a data multiplexer 202 at its input followed by a channel Nyquist filter 204, an upsampler 206, and a digital direct-RF upconverter 208. The dashed line indicates that these elements can, for example, be implemented within a single integrated circuit such as a field programmable gate array (FPGA) or an application specific integrated circuit (ASIC). Such integration options are shown for purposes of example and are not required to practice the described noise control techniques. Any or all of the elements 202, 204, 206, and 208 can be implemented as discrete circuits and/or combinations of hardware, firmware, and/or software without departing from the teachings of this disclosure. RF hardware 212, including a high speed digital-analog converter 214 and an RF Filter and Amplifier 216, processes the output of the digital direct-RF upconverter 208 to generate the modulated RF output 218 of the QAM modulator 200.

Returning to the input of the QAM modulator 200, the data multiplexer 202 receives a digital baseband input signal 220 in the form of, for example, line coded in-phase (I) and quadrature (Q) data to be modulated by the example QAM modulator 200. The data multiplexer 202 also receives a zero power data signal 222 as well as a transient event control signal 224. The transient event control signal 224 can direct the data multiplexer 202 to provide either the digital baseband I.Q. signal 220 or the zero power data signal 222 to the input of the channel Nyquist filter 204. As will be described below, timely operation as directed by the transient event control signal 224 can avoid the generation of broadband noise that could otherwise be created as a result of a transient event.

Example output of the QAM modulator 200 during a transient event where transient event noise control features are not activated will next be described to better explain how the noise control features avoid the generation of broadband noise during such an event.

Figure 3:
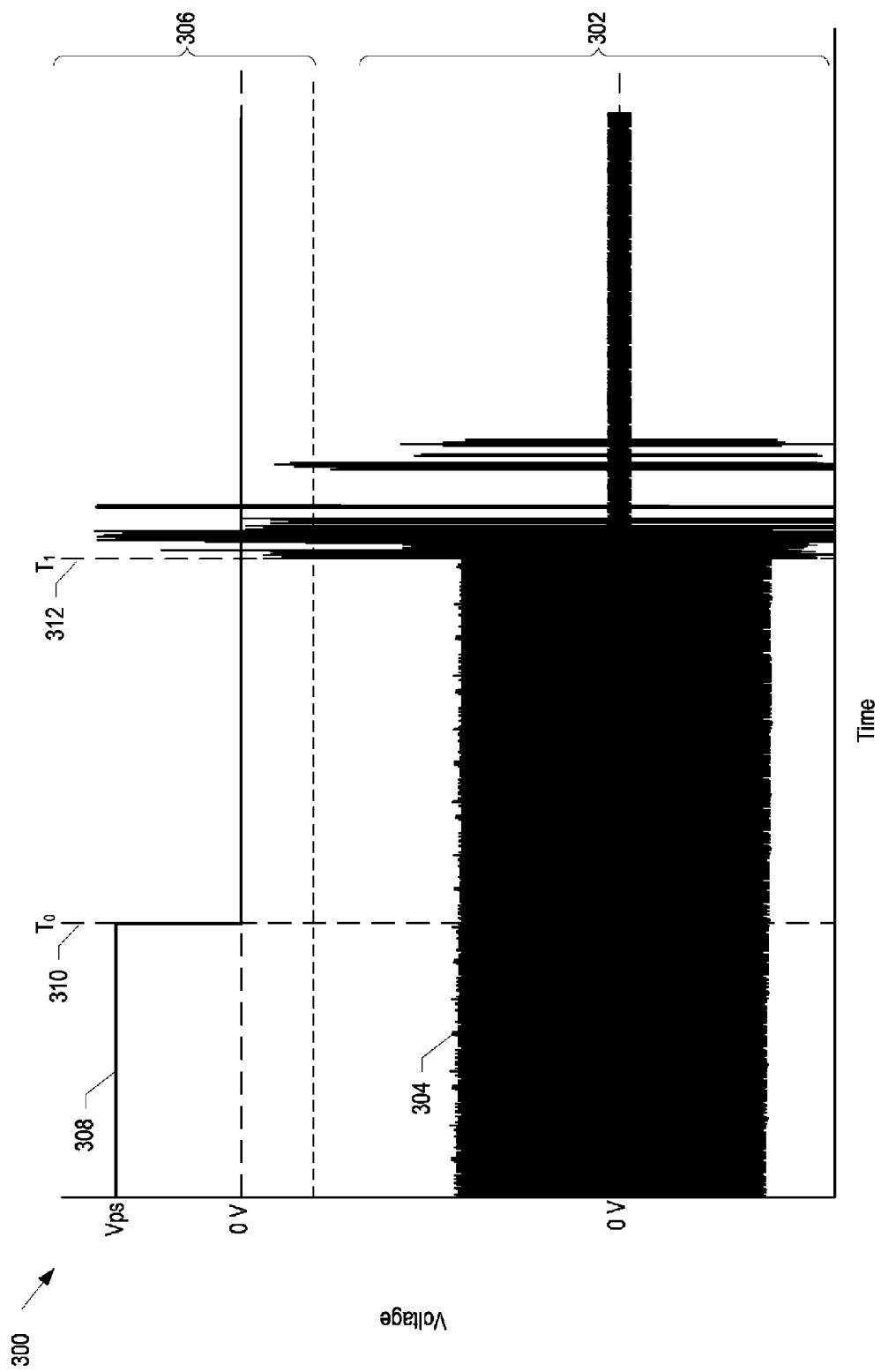
FIG. 3 illustrates example output of an RF modulator without the use of transient noise control during a loss of power event.

FIG. 3 illustrates example output of an RF modulator without the use of transient noise control during a loss of power event. The lower graph section 302 depicts an example modulator output signal 304. In order to show the relative magnitude of the fluctuations in the modulator output signal 304 to its normal output, its graph section extends into the upper graph section 306. The upper graph section 306 depicts a graph of example power supply input voltage Vps 308. Both the power supply input voltage 308 and the modulator output signal 304 are shown as voltage graphs with respect to time. The vertical scale of the two graphs is not necessarily the same.

The power supply input voltage is removed at time $T_0$ marked by line 310. At this point in time the modulator output signal 304 continues as a continuous waveform having frequencies inside a designated bandwidth. The RF modulator output continues after the power supply input voltage 308 is removed due to, for example, energy storage elements within the power supply (e.g., capacitors). After time $T_0$ (line 310), however, the energy stored in one or more of these elements begins to drain and at some point in time $T_1$ (line 312) the energy in these elements is exhausted to a point that one or more elements of the RF modulator will no longer function. When this occurs, sudden unfiltered signal variations within the RF modulator cause its output signal to vary wildly. These variations have sudden discontinuities that include frequencies outside of the channel allocated to the RF modulator. In the frequency domain these sudden discontinuities manifest as broadband noise.

The broadband noise generated by this transient event can disrupt communications on other channels. Communication errors can occur in other channels of the shared communication medium. This transient event for a single RF modulator transmitting one channel in a cable TV head end facility could, for example, cause bit errors that have a detrimental effect on the end user experience (e.g., macro blocking) on some or all of the other television channels. Reduction or elimination of this transient event induced broadband noise protects other channels from experiencing this interference.

Figure 4:
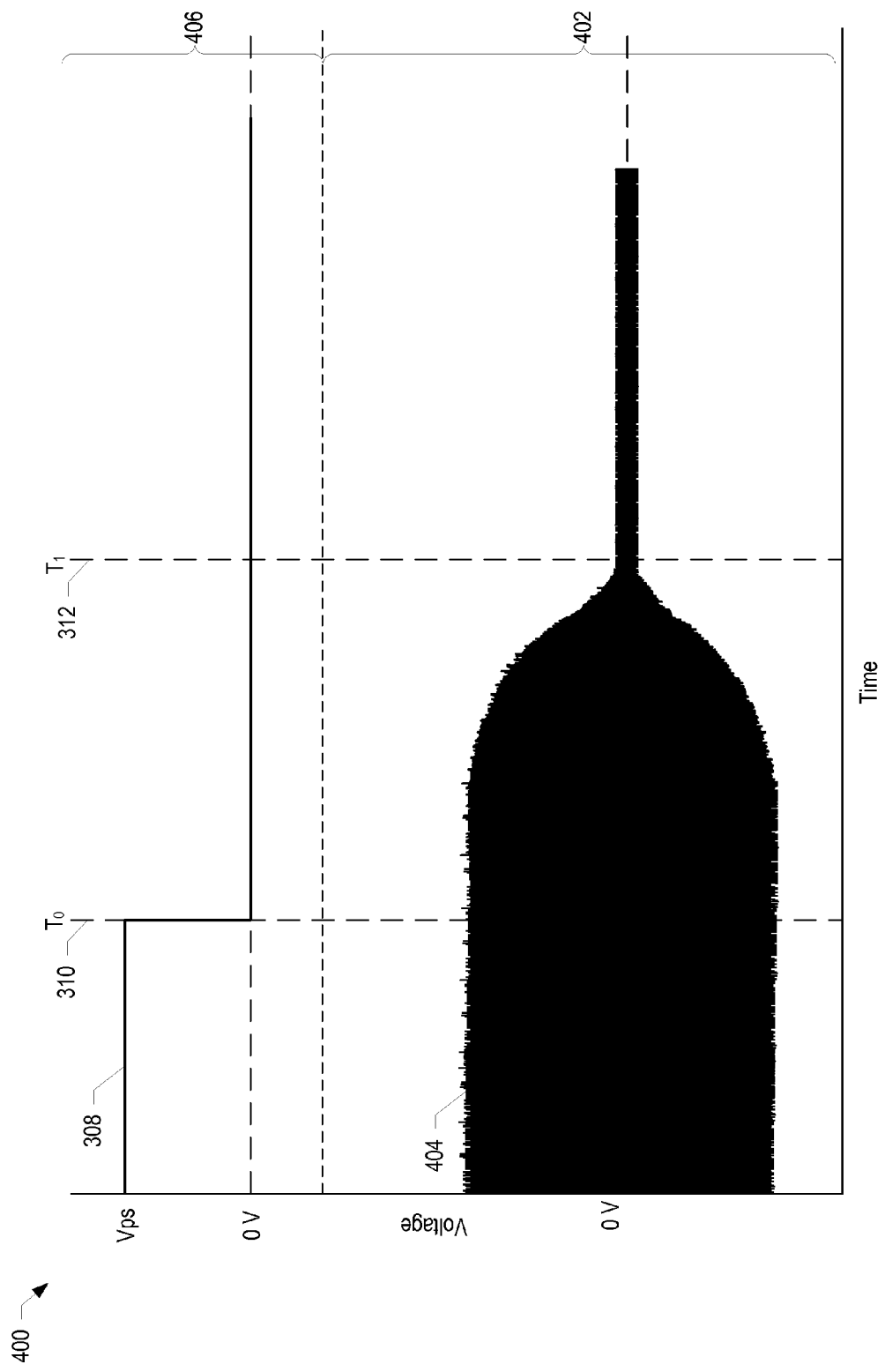
FIG. 4 illustrates example output of an RF modulator during a loss of power event where the output is processed using a variable RF attenuator.

FIG. 4 illustrates example output 400 of an RF modulator during a loss of power event where the output is processed using a variable RF attenuator. The upper section of the graph

406 shows power supply input voltage signal 308 which appears as it did in FIG. 3. The relative placement of line 310, indicating the removal of the power supply input voltage, and line 312, indicating the point in time where normal functioning of the RF modulator would cease due to dissipation of energy storage elements, appears as they did in FIG. 3 as well. The bottom portion of the graph 402, however, shows RF modulator output as processed by a variable RF attenuator. After loss of power to the power supply, the RF attenuator reduces the RF modulator output to near zero before normal operation of the RF modulator ceases upon the draining of, for example, capacitors in the power supply circuitry. From the graph 400, however, it can be seen that this attenuation takes much of the time between $T_0$ and $T_1$. Had the energy storage elements in the power supply drained more quickly, it is possible that the power level of the RF modulator would not have been brought close enough to zero to prevent the circuit from generating broadband interference. Suppressing transient induced broadband noise in this manner requires the addition of a variable RF attenuator at the output of a given RF modulator and selection of variable RF attenuator characteristics and/or power supply characteristics that will permit the power output of a given RF modulator to be sufficiently reduced prior to dissipation of power supply output to a point where normal operation of the RF modulator ceases.

Figure 5:
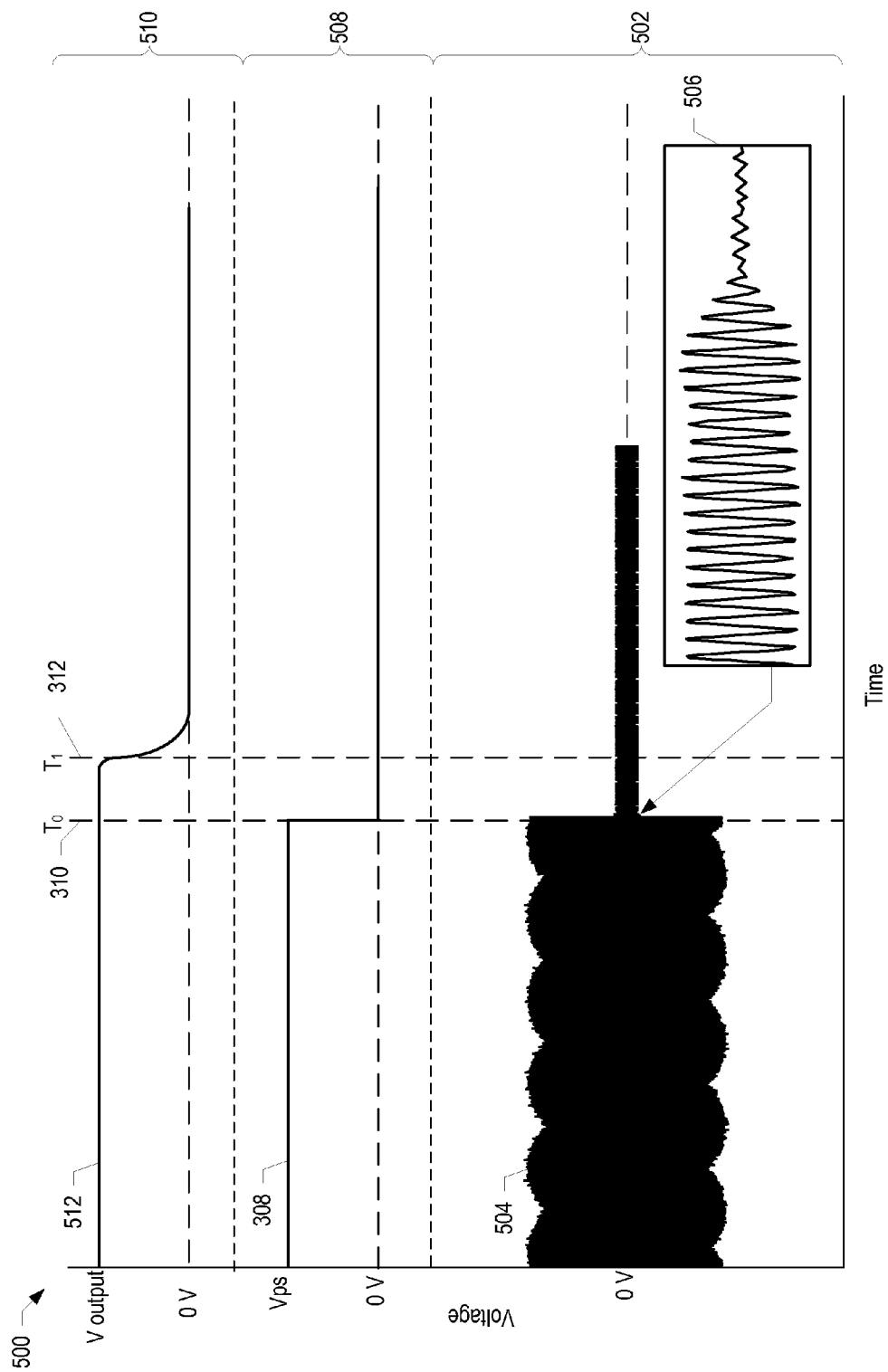
FIG. 5 illustrates example output of the example RF modulator of FIG. 2 employing transient noise control during a loss of power event.

FIG. 5 illustrates a graph 500 including example output of the RF modulator of FIG. 2 employing transient noise control during a loss of power event. The time scale for graph 500 of FIG. 5 is compressed relative to that of FIG. 3 and FIG. 4. Time $T_0$ (line 310) and $T_1$ (line 312), however, still represent the removal of power supply input voltage and the time that the RF modulator would cease normal output due to dissipation of energy storage elements in the power supply. Lower graph section 502 depicts example output of the RF modulator 504 and the inset 506 shows an expanded view of the transition of the output signal that occurs following activation of the transient noise control features of the example RF modulator of FIG. 2. Middle graph section 508 depicts the power supply input voltage 308, and upper graph section 510 depicts the output voltage 512 of the power supply to the RF modulator.

At time $T_0$ (line 310) the power supply input voltage 308 can be seen falling to zero and at time $T_1$ (line 312) the power supply output voltage 512 can be seen falling to a level that, for example, no longer supports normal operation of the RF modulator. The output signal of the RF modulator 504 is shown being decreased to zero or near zero power soon after the power supply input voltage 308 is removed. To cause cessation of the output of the RF modulator, a signal indicating that the input power voltage has been removed can be provided, for example, as the transient event control signal 224 of FIG. 2. This signal can direct the data multiplexer 202 to switch its output from the digital baseband I.Q. signal 220 to the zero power data signal 222. As will be explained more fully below, this reduction in power can occur within one symbol period of the example QAM RF modulator following the indication of the transient event by the transient event control signal, and the power output can be reduced in this manner without introducing discontinuities that generate broadband interference.

Alternatively, a signal indicating loss of power supply input can be provided to one or more circuit elements functioning as a transient event detector (element 114 of FIG. 1, for example), that can then direct the operation of the example RF modulator 200 through the transient event control signal 224. In some implementations, a transient event detector 114 can receive monitoring signals from a number of sources that indicate one or more actual or impeding transient events. For example, a transient event detector can receive signals indicating any or all of an actual or impending loss of power supply input, application of power to the power supply, thermal overload, recovery from thermal overload, exceeding a maximum current threshold, and recovery from having exceeded a maximum current threshold.

Figure 6:
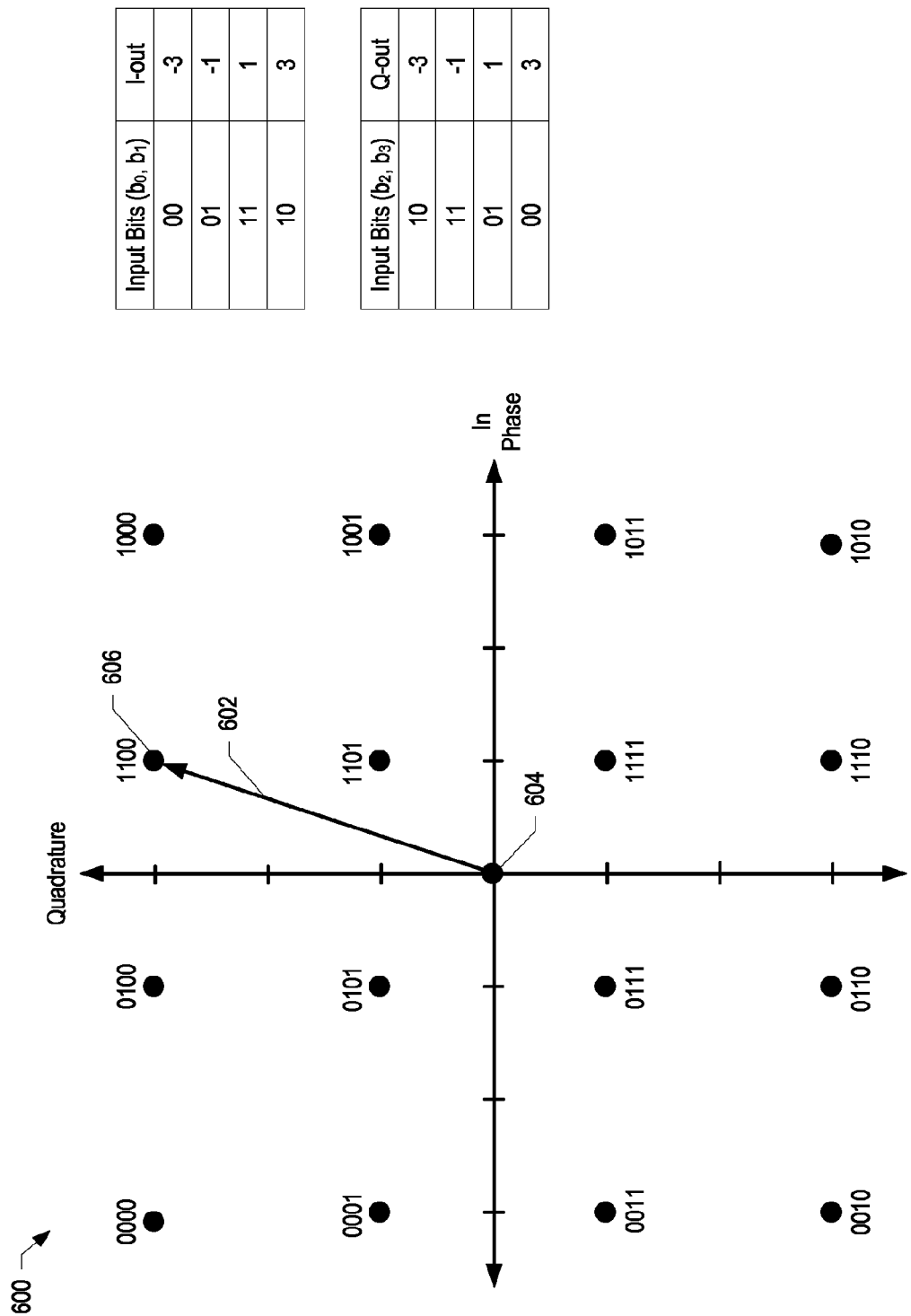
FIG. 6 illustrates a zero power coordinate on a sixteen quadrature amplitude modulation (16-QAM) constellation diagram.

FIG. 6 illustrates a zero power coordinate 604 on a 16-QAM constellation diagram 600. Corresponding line coding charts for symbol bits $b_0$-$b_3$ are also shown. During operation, for example, of the QAM RF modulator 200 of FIG. 2, at any given sample of the digital baseband I.Q. signal input to the data multiplexer 202, the vector 602 points to one of the 16 possible positions shown on the constellation diagram 600. For example, at a given sample point, the vector 602 can point from the origin 604 to the point in the constellation diagram 606 that represents the symbol corresponding to binary '1100'. It can be seen from the constellation diagram that each of the 16 possible symbols has some level of output power associated with it. The origin is not a valid coordinate for conveying symbol information using 16-QAM. The symbol representing binary zeros '0000', for example, has an in phase component of −3 and a quadrature component of +3. These values are used to modulate the amplitude of the in phase and quadrature sinusoidal waveforms that make up the output of the RF modulator. Therefore, no matter which of the 16 symbols is being transmitted, the RF modulator is generating some level of power output.

The 16-QAM line coding (symbol mapping) format of FIG. 6 is shown for purposes of illustration and is one of many that can be used. Line coding functions are generally performed by a symbol mapping module (not shown in FIG. 2) that can generate, for example, the digital baseband I.Q. signal 220 of FIG. 2 that is provided to the input of the data multiplexer 202. A symbol mapping module generally receives binary information (data bits) and outputs symbols in the form of a line coded baseband signal corresponding to the inputted data bits.

The use of a 16-QAM modulation format is described in this disclosure for purposes of illustration. The teachings of this disclosure are not limited to use with this format. Other digital modulation formats can be used such as, for example, other QAM modulation formats including, but not limited to, 64-QAM, 256-QAM, and 1024-QAM. The origin is generally not a valid coordinate for conveying information in any of these modulation formats or any of their line coding formats.

The zero power data signal 222 provided to the data multiplexer 202 represents the origin 604 of the constellation diagram. If the data multiplexer 202 passes the zero power data signal 222 through to the RF modulator components, the amplitude of the in phase and quadrature sinusoidal waveforms that are generated by the RF modulator are reduced to zero. Modulation of the zero power data signal 222 therefore results in no power output from the example RF modulator 200. The transition from normal RF modulator output to zero output can occur in a time interval that is equal to the propagation delay of the channel Nyquist filter. The propagation delay is dependent, for example, on a number of taps in a channel Nyquist filter at the input stage of a given RF modulator. In some implementations, the propagation delay is, for example, approximately 40 symbol periods. The described transient event control technique uses the channel Nyquist filter already present in the example RF modulator 200. High frequencies associated with the switch from the previous 16-QAM symbol to the zero power data signal are filtered out by the channel Nyquist filter 204 just as the high frequencies associated with the switch from one symbol to another are filtered out. Additional processing elements at the output of the RF modulator such as attenuators or additional filters are not required.

The power output of the RF modulator is quickly, yet smoothly, reduced to zero using existing processing components upon detection of the power loss event. The power output of the RF modulator can be reduced to near zero well before the actual loss of power to the circuits of the RF modulator.

This disclosure describes the use of a data multiplexer 202 in the example implementation for transitioning the input of the RF modulator from the digital baseband signal 220 to the zero power data signal 222. The use of a data multiplexer 202 for this purpose is given for example only. Other configurations, however, may be apparent to those of ordinary skill in the art for selectively providing (in response to a transient event) a zero power data signal to the input of a digital RF modulator. Any such alternative techniques do not depart from the teachings of this disclosure, and remain within the scope of the present invention.

Similar operations as those described above can be employed to guard against the generation of broadband noise during other transient events that will generically result in an RF modulator shutdown. In addition, similar, yet time inverted operations can be initiated in response to transient events that will generically result in RF modulator start up.

Figure 7:
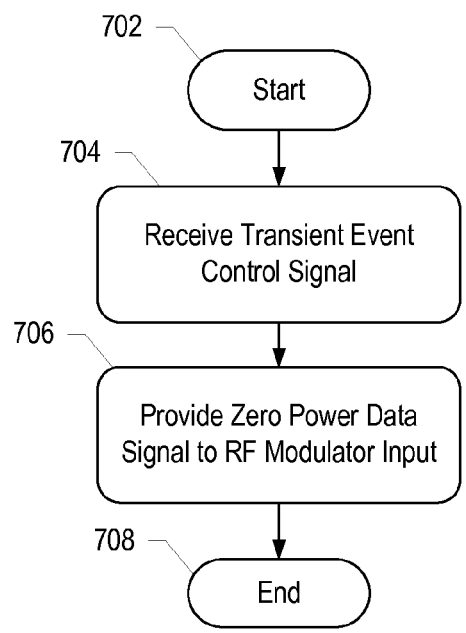
FIG. 7 is a flowchart of an example method of operating an RF modulator with transient noise control.

FIG. 7 is a flowchart of an example method 700 of operating an RF modulator with transient noise control. The method starts at block 702. At block 704 a transient event control signal is received. For example, a transient event control signal can be received indicating that a transient event is imminent and/or already underway. At block 706 a zero power data signal is provided to the input of the RF modulator. For example, input to the RF modulator can be switched from a digital baseband signal being modulated by the RF modulator to the zero power data signal in response to receipt of the transient event control signal indicating that a transient event is imminent and/or already underway. The method ends at block 708.

Figure 8:
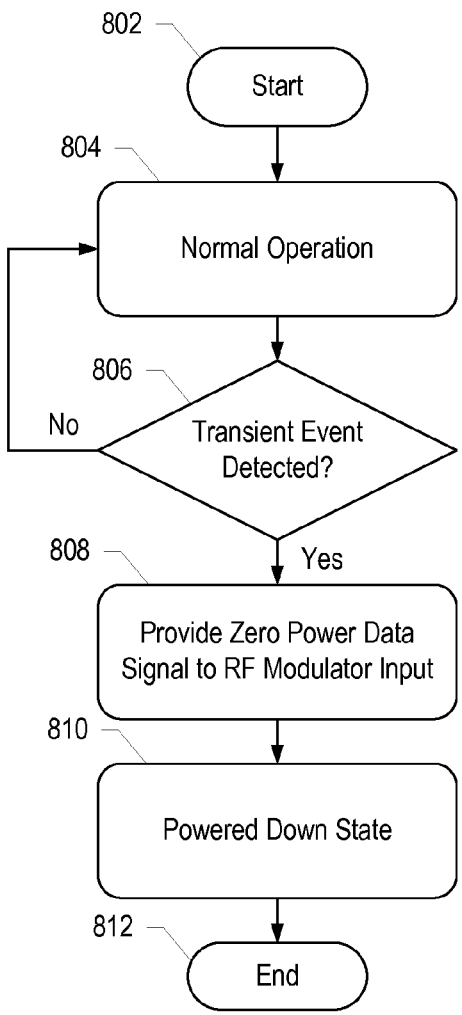
FIG. 8 is a flowchart of an example method of operating an RF modulator with transient noise control during a shut down event.

FIG. 8 is a flowchart of an example method 800 of operating an RF modulator with transient noise control during a shut down event. The method starts at block 802. At block 804 the RF modulator is in a state normal of operation. Normal operation can include, for example, modulating a digital baseband signal received at an input of the RF modulator and outputting a corresponding modulated signal. If no transient event is detected at decision block 806 the RF modulator continues in a state of normal operation. For example, a transient event control signal can be monitored to determine if a transient event has been detected. If a transient event is detected at decision block 806, operation proceeds to block 808. At block 808 a zero power data signal is provided to the input of the RF modulator. For example, input to the RF modulator can be switched from a digital baseband signal to the zero power data signal in response to the detection of a transient event. The RF modulator enters a powered down state at block 810. The method ends at block 812.

Figure 9:
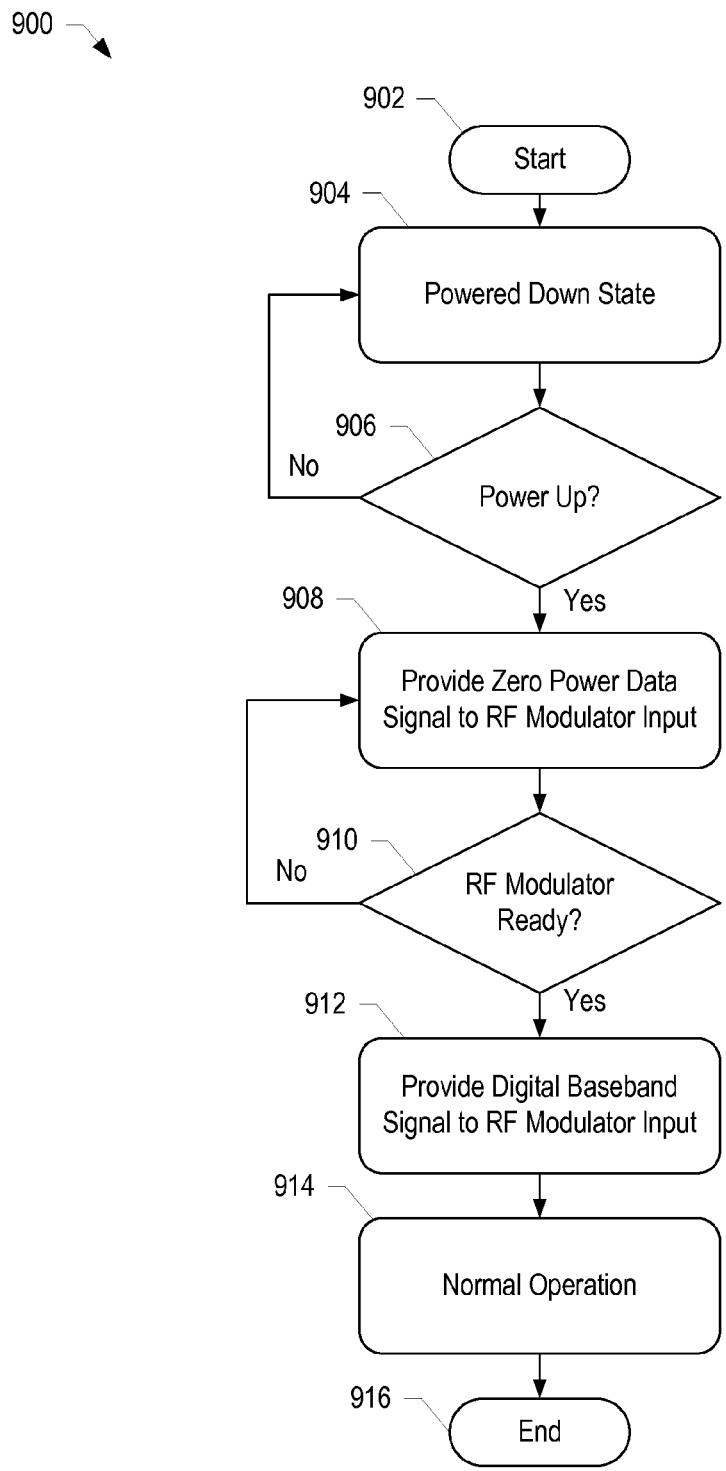
FIG. 9 is a flowchart of an example method of operating an RF modulator with transient noise control during a start up event.

FIG. 9 is a flowchart of an example method 900 of operating an RF modulator with transient noise control during a start up event. The method starts at block 902. At block 904 the RF modulator is in a powered down state. At decision block 906, if the RF modulator is not powered up, the RF modulator remains in a powered down state 904. Power to the RF modulator can, for example, be monitored by a circuit that receives power from an alternative source, such as a battery or a circuit that upon power being supplied to both it and the RF modulator becomes functional before the RF modulator. If power up of the RF modulator is detected, the method proceeds to block 908 where a zero power data signal is provided to the input of the RF modulator. For example, a zero power data signal can be provided to the input of the RF modulator in response to the detection of the transient power up event. If the RF modulator is not ready for input at decision block 910, the zero power data signal continues to be provided to the input of the RF modulator 908. For example, the zero power data signal can be provided to the input of the RF modulator until a ready condition is met. A ready condition can be a condition in which the RF modulator is ready to receive one or more digital baseband signals for modulation. A ready condition can be determined by monitoring the output of the RF modulator and/or monitoring one or more intermediate signals within the RF modulator. Alternatively, for example, a ready condition can be presumed after the passage of an amount of time known to be sufficient for the RF modulator to reach a ready condition following initial application of power to the RF modulator. If the RF modulator is ready, the method proceeds to block 912. At block 912 a digital baseband signal is provided at the input of the RF modulator. For example, input to the RF modulator can be switched from the zero power data signal to a digital baseband signal. The RF modulator continues in normal operation at block 914. For example, the RF modulator can provide a modulated output signal based on one or more digital baseband signals provided as input. The method ends at block 916.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal, that is generated to encode information for transmission to suitable receiver apparatus for execution by a computer. The computer-readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, computers can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. An apparatus comprising:
a radio frequency (RF) modulator for modulating a digital signal comprising a filtered input stage; and
a switch comprising:
a switch output connected to the input stage of the RF modulator;
a first switch input for receiving a zero power data signal; and
a second switch input for receiving a transient event control signal,
the switch being configured to selectively provide the zero power data signal to the switch output based on the transient event control signal.

2. The apparatus of claim 1, wherein:
the switch further comprises a third switch input for receiving a digital baseband signal; and
the switch is configured to selectively provide the zero power data signal or the digital baseband signal to the switch output based on the transient event control signal.

3. The apparatus of claim 1, wherein:
the switch further comprises additional switch inputs for receiving digital baseband signals; and
the switch is configured to selectively provide the zero power data signal or at least one of the digital baseband signals to the switch output based on the transient event control signal.

4. The apparatus of claim 1, wherein the input stage of the RF modulator comprises a channel Nyquist filter.

5. The apparatus of claim 1, wherein a modulated output signal the RF modulator is ceased as a result of the zero power data signal being provided to the switch output.

6. The apparatus of claim 1, wherein:
the input stage of the RF modulator comprises a channel Nyquist filter;

a modulated output signal of the RF modulator is ceased as a result of the zero power data signal being provided to the switch output; and cessation of the modulated output signal occurs within a characteristic propagation delay time of the channel Nyquist filter.

7. The apparatus of claim 1, wherein the switch is a data multiplexer.

8. The apparatus of claim 1, wherein:
the switch further comprises a third switch input for receiving a digital baseband signal; and
the switch is operable to provide the digital baseband signal at the switch output responsive to receipt of a first state of the transient event control signal and operable to provide the zero power data signal at the switch output responsive to receipt of a second state of the transient event control signal.

9. The apparatus of claim 1, wherein the digital baseband signal comprises a line coded signal.

10. The apparatus of claim 1, wherein the RF modulator comprises a QAM modulator.

11. The apparatus of claim 1, wherein:
The RF modulator comprises a QAM modulator; and
the switch further comprises at least one additional switch input for receiving a line coded in phase signal and quadrature signal.

12. The apparatus of claim 1, further comprising:
a transient event controller for generating a transient event control signal.

13. The apparatus of claim 12, wherein the transient event controller is configured to:
detect a power loss event; and
generate the transient event control signal based on the detection of the power loss event.

14. The apparatus of claim 12, wherein the transient event controller is configured to:
detect a power application event; and
generate the transient event control signal based on the detection of the power application event.

15. The apparatus of claim 12, wherein the transient event controller is configured to:
detect a thermal overload event; and
generate the transient event control signal based on the detection of the thermal overload event.

16. An apparatus comprising:
a radio frequency (RF) modulator for modulating a digital signal; and
means for switching a signal provided to an input stage of the RF modulator between a digital baseband signal and a zero power data signal based on a transient event control signal.

17. A method comprising:
receiving a transient event control signal; and
providing a zero power data signal to a filtered input stage of a digital RF modulator based on the transient event control signal to limit the generation of noise by the RF modulator outside of an assigned channel.

18. The method of claim 17, wherein the transient event control signal indicates an impending shutdown event and the zero power data signal is provided to the filtered input stage of the RF modulator until the RF modulator no longer receives power.

19. The method of claim 17, where the transient event control signal indicates a startup event, the method further comprising:
maintaining the zero power data signal at the filtered input stage of the digital RF modulator until a ready condition is met; and
providing a digital baseband signal at the filtered input stage of the digital RF modulator after the ready condition is met.

20. The method of claim 19, wherein the ready condition is the elapse of a given amount of time following receipt of the transient event control signal, the given amount of time being of sufficient length to permit components of the RF modulator to reach a state in which the RF modulator can provide a modulated output signal within an assigned channel based on a digital baseband input.

* * * * *